(12) United States Patent
Henriksson

(10) Patent No.: US 7,522,513 B2
(45) Date of Patent: Apr. 21, 2009

(54) METHOD AND SYSTEM FOR RECEIVING A MULTI-CARRIER SIGNAL

(75) Inventor: Jukka Henriksson, Espoo (FI)

(73) Assignee: Nokia Corporation, Espoo (FI)

( * ) Notice: Subject to any disclaimer, the term of this patent is extended or adjusted under 35 U.S.C. 154(b) by 794 days.

(21) Appl. No.: 10/505,663

(22) PCT Filed: Feb. 27, 2003

(86) PCT No.: PCT/FI03/00140

§ 371 (c)(1),
(2), (4) Date: Aug. 25, 2004

(87) PCT Pub. No.: WO03/073683

PCT Pub. Date: Sep. 4, 2003

(65) Prior Publication Data

US 2005/0220001 A1 Oct. 6, 2005

(30) Foreign Application Priority Data

Feb. 28, 2002 (FI) .................................. 20020387

(51) Int. Cl.
*H04J 11/00* (2006.01)
(52) U.S. Cl. ...................................... 370/208; 370/241
(58) Field of Classification Search ................. 370/203, 370/205, 208, 210, 212, 213, 241
See application file for complete search history.

(56) References Cited

U.S. PATENT DOCUMENTS 4,688,265 A * 8/1987 Chemelewski .............. 455/223

(Continued)

FOREIGN PATENT DOCUMENTS

EP 1043874 A2 10/2000

(Continued)

OTHER PUBLICATIONS

Sliskovic, "Signal processing algorithm for OFDM channel with impulse noise", conference proceeding for The 7th IEEE International Conference on Electronics, Circuits and Systems, 2000, ICECS 200, Dec. 17-Dec. 20, 2000, ISBN 0-7803-6542-9, pp. 222-225, vol. 1.*

(Continued)

*Primary Examiner*—Kwang B Yao
*Assistant Examiner*—Andrew Lai
(74) *Attorney, Agent, or Firm*—Banner & Witcoff, Ltd.

(57) ABSTRACT

Method and system for tolerating impulsive burst noise in pilot based OFDM systems, especially using DVB-T standard. The method contains following steps: 1) recognition of the impulse position and possibly length in the time domain symbol, 2) blanking of those samples of the symbol where significant amount of impulse noise is present, 3) calculating the first estimate of the received signal from the blanked symbol, 4) using a prior information (guard band carriers, pilot carriers) an estimate of the blanked symbol is calculated using inverse FFT on the differences of the observed carrier values from the known values in the frequency domain, 5) correction values for the frequency domain carriers are derived taking the FFT of the restored time domain samples, 6) finally the corrected estimate of the received symbol is derived by summing the correction values of step 5 to the first estimate of carriers derived in step 3. The method allows correction of relatively long bursts of impulse noise with minor degradation. The method provides considerably reliable data reception in broadcast systems.

40 Claims, 8 Drawing Sheets

U.S. PATENT DOCUMENTS

| | | | | |
|---|---|---|---|---|
| 5,463,662 | A | * | 10/1995 | Sutterlin et al. ............. 375/351 |
| 5,694,389 | A | * | 12/1997 | Seki et al. .................... 370/208 |
| 5,867,478 | A | * | 2/1999 | Baum et al. .................. 370/203 |
| 6,009,089 | A | * | 12/1999 | Huang et al. ................. 370/342 |
| 6,397,368 | B1 | * | 5/2002 | Yonge et al. ................. 714/792 |
| 6,442,129 | B1 | * | 8/2002 | Yonge et al. ................. 370/204 |
| 6,442,222 | B1 | * | 8/2002 | Ghazi-Moghadam et al. .... 375/347 |
| 6,768,713 | B1 | * | 7/2004 | Siala et al. .................. 370/203 |
| 2003/0043925 | A1 | * | 3/2003 | Stopler et al. ............... 375/254 |

FOREIGN PATENT DOCUMENTS

EP          1180851 A2     2/2002

OTHER PUBLICATIONS

Electronics, Circuits and Systems, 2000, ICECS 2000, The 7$^{th}$ IEEE International Conference on pp. 222-225, Sliskovic, M. et al, "Signal processing algorithm for OFDM Channel with impulse noise". Retrieved on May 16, 2003, http: // search, ieeexplore. Ieee. Org/ search 97/is. vts ?action=view & VdkVgwKey=9115...abstract, section 4.

* cited by examiner

METHOD AND SYSTEM FOR RECEIVING A MULTI-CARRIER SIGNAL

This application is a National Stage application of co-pending PCT application PCT/FI03/00140 filed Feb. 27, 2003, which was published in English under PCT Article 21(2) on Sep. 4, 2003, which claims the benefit of the FI Application No. 20020387 filed 28 Feb. 2002. These applications are incorporated herein by reference in their entireties.

TECHNICAL FIELD OF THE INVENTION

This invention relates to systems and methods for distributing data over a data link.

BACKGROUND OF THE INVENTION

Broadcast has an almost century long tradition in radio. Even with TV, the history goes back to 1930's. Broadcasting has been successful throughout the world in bringing both entertainment and information to mass audiences.

The latest step in broadcasting is the digitalization of both radio and TV. Digital radio has not gained much acceptance on the market. However, many hope that digital TV will bring new benefits and services to the consumer and, as a result, generate new revenue streams for the broadcasting industry. The basic concept of the TV service itself has, however, not changed much. Rather, the TV lives on as before even if it has become digital.

In later half of 1990's we saw the boom of the Internet. A whole set of new services and content became available to the consumers during a short, revolutionary and hype intense period. That period introduced e-commerce, Internet Service Providers (ISPs), Portals, eyeballs game, dotcom companies and even the new economy. The developments in both access technologies (e.g. ADSL) and coding technologies (e.g. MPEG-2 streaming) has made it possible to bring rich media content like video content to homes via the Internet. Despite of these technology and market breakthroughs media houses have been reluctant to distribute their content via the Internet due to its "free-of-charge" nature and the direct threat of piracy. Neither has Internet been able to challenge the role of traditional media as the primary advertisement platform despite its great popularity.

Impulsive interference is observed in broadcast to cause difficulties in broadcast reception. This interference may be produced by ignition sparks from vehicles or various household appliances like hair-dryers, vacuum cleaners, drilling machines etc. The cheapest models of these tools often have insufficient interference suppression. Also—for the same reason—single or even burst of pulses occur while switching on or off any device connected to the power line. These could be electrical heating devices, thyristor dimmers, fluorescent lamps, refrigerators etc. This has to be taken into consideration, especially in indoor reception with a simple omnidirectional aerial. Field strength of a broadcast signal, especially for a portable device situated indoors, can be quite low and further weakened by multipath reception. For fixed reception, insufficient cable shielding within in house signal distribution often reduces the benefit of a roof aerial, making the signal reception sensitive to impulsive interference.

One approach in trying to solve the impulsive noise has been based on clipping the impulse bursts. After clipping, the samples are given the value which corresponds to the clipping level amplitude (and keeping the phase). Or the clipped values may be given value zero because these samples are known to be unreliable in any case. An example of the approaches in these lines has been a patent publication EP 1 043 874 A2, incorporated herein as a reference. In this publication, signal levels exceeding certain clipping levels in time domain are detected and those samples are then replaced by zeros. However, this approach leaves the corrupted but unclipped samples untouched which leads to poor signal-to-interference ratio, especially, if the burst power is high. Moreover, the clipping methods leave impulse levels, not detected, untouched which means that their capabilities are limited. Further, the mere blanking of signal makes signal-to-noise ratio poor.

Another known approach in trying to solve the impulsive noise is to blank all the samples that are known to be corrupted, for example, belonging to an interference burst period. The knowledge of impulse position and duration may be based, for example, on monitoring exceeding of certain clipping levels. One such approach is presented in a publication, Sliskovic, M: Signal processing algorithm for OFDM channel with impulse noise. Electronics, Circuits and Systems, 2000. ICECS 2000. The 7th IEEE International Conference on, Volume: 1, 2000, Page(s): 222-225 vol. 1, incorporated herein as a reference. However, this method is too straightforward, since all burst suspected of interference are totally blanked. The modified signal is very different than the original, because all data values within the interference are blank and have no correspondence between the original values. Thus, the mere blanking of signal makes signal-to-noise ratio poor. In order to make the performance of blanking approach better, one could try to solve an equation giving the samples of the original signal that have been removed. If the noise burst is detected and the corresponding time samples blanked, theoretically it might be possible to use the information that there should be no signal on the empty carriers (in the guard band) to restore the original post-FFT values. Such an approach has been described in the referred IEEE publication. Unfortunately the method described in the reference requires a solution of general complex system equations which is cumbersome and heavy (generalized matrix inversion, where dimension of matrix is several hundreds or even over 1000). This is complex and difficult to solve. Also relying only to the spectrum part in the guard band turns out to be inefficient in systems with thousands of carriers received through a noisy channel such as the OFDM system. The missing samples cannot be reliably solved. Moreover, the receiver is unable to perform the required theoretically complex calculation. In addition, information about guard band is too vulnerable to the noise, and solutions are inaccurate. Therefore, an approximate solution for estimate is needed.

Thus, there is a need for a reception which can withstand a higher level of interference such as the impulse interference and improve data reception quality.

SUMMARY OF THE INVENTION

Now a method and arrangement has been invented to resist impulse interference in a received multi-carrier signal which is transferred over a data link.

In accordance with a first aspect of the invention there is provided a method for receiving a multi-carrier signal, the method comprising the steps of:
  detecting a presence of impulse interference within the signal, and
  replacing digital values substantially affected by the impulse interference with estimated digital values, which are obtained by determining an estimate in a frequency domain based on modified digital values substantially affected by the impulse interference and prior known information, the estimated digital values representing a desired signal.

In accordance with a second aspect of the invention there is provided a receiver for receiving a broadcast multi-carrier signal, the receiver comprising:

means for detecting a presence of impulse interference within the signal, and means for replacing digital values substantially affected by the impulse interference with estimated digital values, which are obtained by determining an estimate in a frequency domain based on modified digital values substantially affected by the impulse interference and prior known information, the estimated digital values representing a desired signal.

In accordance with a third aspect of the invention there is provided a system for receiving a multi-carrier signal, the system comprising:

means for detecting a presence of impulse interference within the signal, and means for replacing digital values substantially affected by the impulse interference with estimated digital values, which are obtained by determining an estimate in a frequency domain based on modified digital values substantially affected by the impulse interference and prior known information, the estimated digital values representing a desired signal.

In accordance with a fourth aspect of the invention there is provided a computer program product comprising a program of instructions executable by a computing system for processing a reception of a broadcast multi-carrier signal, the computer program product comprising:

computer program code for detecting a presence of impulse interference within the signal, and computer program code for replacing digital values substantially affected by the impulse interference with estimated digital values, which are obtained by determining an estimate in a frequency domain based on modified digital values substantially affected by the impulse interference and prior known information, the estimated digital values representing a desired signal.

BRIEF DESCRIPTION OF THE DRAWINGS

The invention will now be described, by way of example only, with reference to the accompanying drawings, in which.

DETAILED DESCRIPTION OF THE EMBODIMENTS

Figure 1:
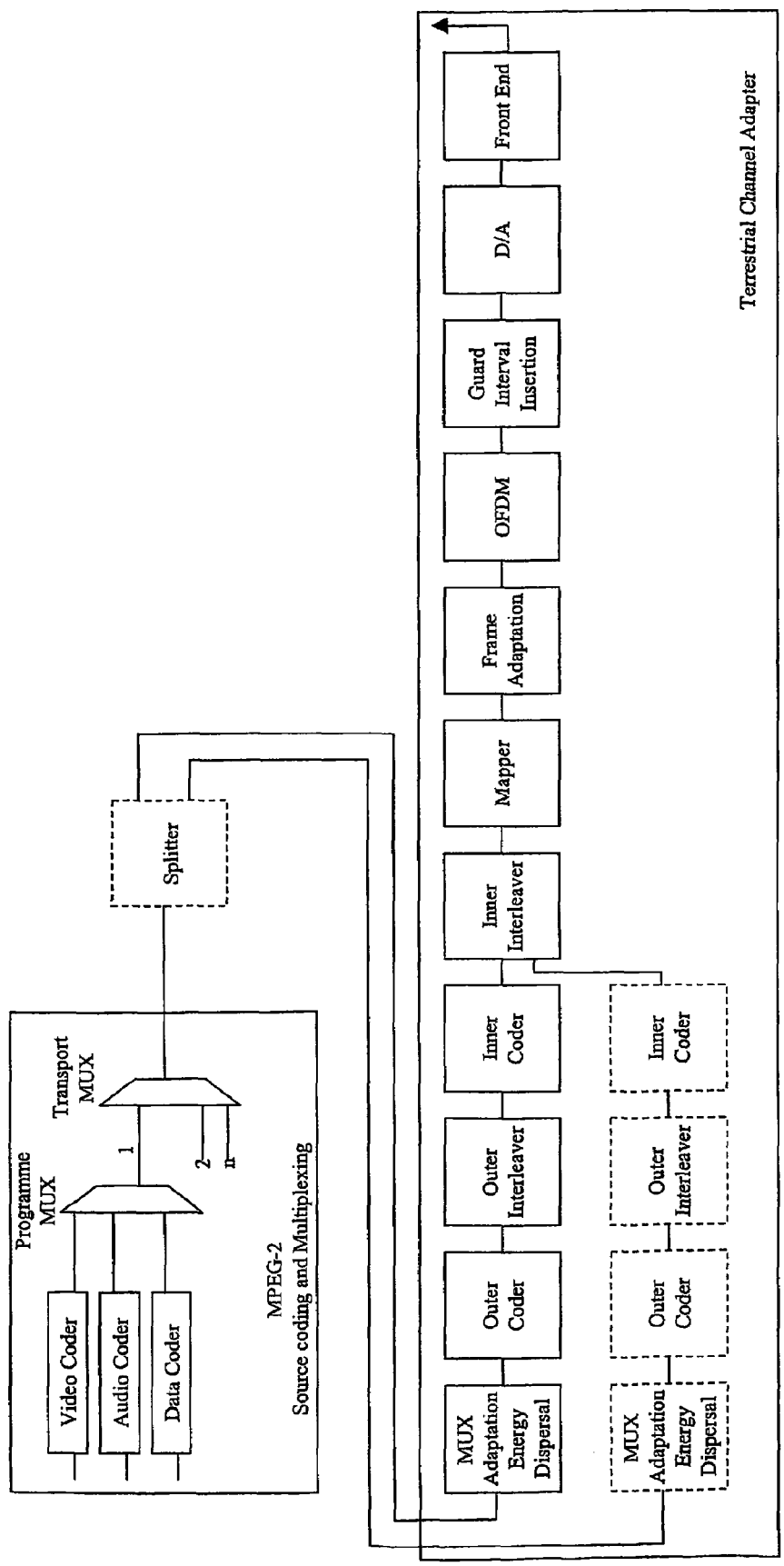
FIG. 1 shows an example of a generation of the transmitted signal in DVB-T.

Preferable embodiments of the invention provide a method for tolerating impulsive burst noise in pilot based OFDM systems, especially using DVB-T standard such as Digital Video Broadcasting (DVB): Framing structure, channel coding and modulation for digital terrestrial television, ETSI EN 300 744. The method contains following steps: 1) recognition of the impulse position and possibly length in the time domain symbol, 2) blanking of those samples of the symbol where significant amount of impulse noise is present, 3) calculating the first estimate of the received signal from the blanked symbol, 4) using prior information (guard band carriers, pilot carriers) an estimate of the blanked symbol is calculated using inverse FFT on the differences of the observed carrier values from the known values in the frequency domain 5) correction values for the frequency domain carriers are derived taking the FFT of the restored time domain samples, 6) the corrected estimate of the received symbol is derived by summing the correction values of step 5 to the first estimate of carriers derived in step 3. The method allows correction of relatively long bursts of impulse noise with minor degradation only. The complexity of the scheme and the additional energy consumption are fairly low. The method improves previously known solutions by providing considerably more efficiency in broadcast data reception.

Advantageously, relatively long bursts of impulse noise can be tolerated as compared to other methods. The elimination of the bursts is insensitive to the burst strengths, and the corrected bursts length can be as high as several hundred samples. The burst power may exceed the instantaneous signal power by tens of decibels. While the impulse burst(s) is corrected, the degradation on the overall performance is quite minor compared to the original transmitted signal without the interference(s). If no impulse noise is present, there is very small to no degradation. The method is fairly robust, channel noise does not degrade the performance very sharply. The method is easily applicable. The receiver detects the impulse. The receiver may determine where the impulse is located. In one simple approach not even the impulse length is needed. The used algorithm has practically no variances due to different burst noise scenarios. Required changes to existing chip design are minor and can be fairly easily implemented rendering the invention flexible to implement. The additional energy required for calculations is quite reasonable and poses no major obstacle for the receiver device.

Digital Video Broadcasting (DVB) offers a high bandwidth transmission channel wherein delivery is typically multicast or alternatively unicast. The high bandwidth transmission channel can offer a user of such system various services. Proper receiving of the transmitted broadcast data is necessary to focus on the services. A Terrestrial Digital Video Broadcasting (DVB-T) uses Orthogonal Frequency Division Multiplexing (OFDM) in signal transmission and DVB-T is preferably applied in the invention. Alternatively, the invention is also applicable in other OFDM systems, for example transmissions according to Terrestrial Integrated Services Digital Broadcasting (ISDB-T, Japanese standard for digital television, terrestrial), because these kinds of systems provide and use prior know information such as pilot values and may also have empty carriers within the signal bandwidth.

The digital broadcast transmission provides a receiver device with huge amount of data information. The receiver device should be able to substantially receive data of the service. A nature of the digital broadcast transmission is that the transmission is a streaming distribution typically to multiple receivers or alternatively unicast point-to-point distribution to a single receiver. A data distribution link of the broadcast delivery can be a wireless link, a fixed link, or a wired link. For example, DVB-MHP (Multimedia Home Platform) provides the receiver with multiple data distribution links. The digital broadcast transmission system(s) may have an interaction with the receiver but the interaction is not a mandatory requirement. The system(s) with the interaction can requests data having errors to be retransmitted but the broadcast reception (having the stream delivery nature) should be able to tolerate errors in data distribution. Therefore, the reception of the digital transmission should be reliable and tolerate, for example, the impulse interference.

Some embodiments of the applied signal in the invention are based on the methods and system presented in a specification EN 301 701 V1.1.1 (2000-08) Digital Video Broadcasting (DVB); OFDM modulation for microwave digital terrestrial television, incorporated herein as a reference.

Some embodiments of the invention apply a generation of the transmission signal in DVB-T. These kinds of solutions are presented in a publication EN 300 744 V1.4.1 (2001-01) Digital Video Broadcasting (DVB); Framing structure, channel coding and modulation for digital terrestrial television, incorporated herein as a reference. FIG. 1 shows an example of a generation of the transmitted signal in DVB-T, which is described in chapter 4.1 of EN 300 744. Two modes of operation are defined: a "2K mode" and an "8K mode". The "2K mode" is suitable for single transmitter operation and for small Single Frequency Networks (SFN) with limited transmitter distance. The "8K mode" can be used both for single transmitter operation and for small and large SFN networks.

Figure 2:
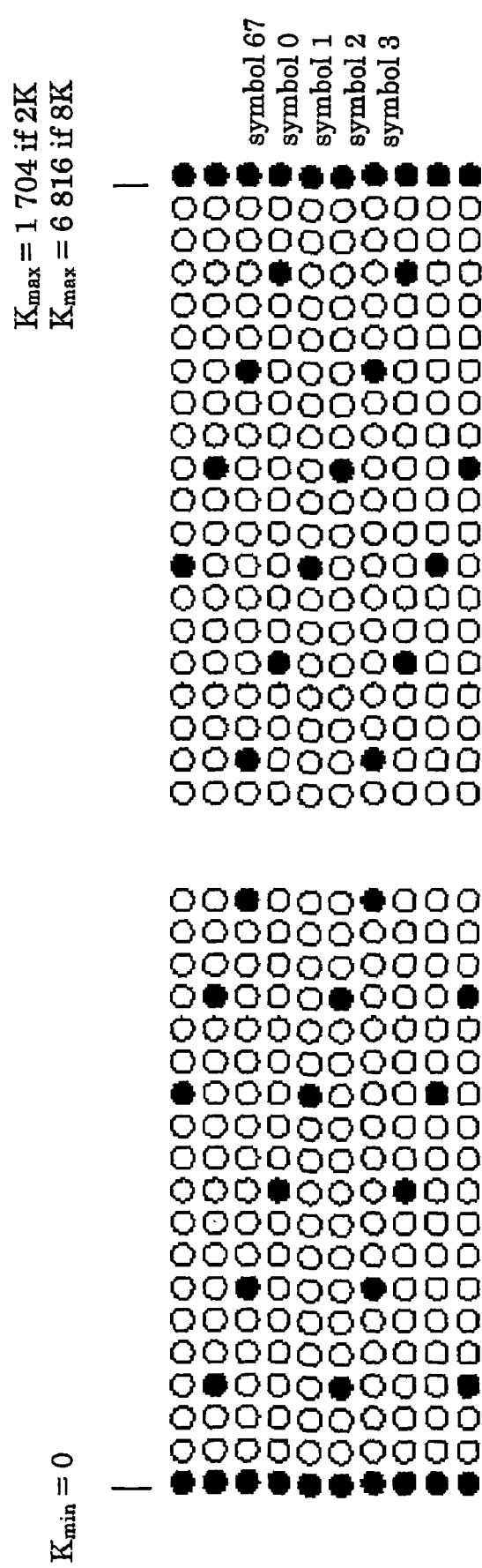
FIG. 2 shows an example of the frame structure and how pilots are located in DVB-T in accordance with a further embodiment of the invention.

Some embodiments of the invention apply prior known information distributed within the transmission signal. These kinds of solutions are presented in the publication EN 300 744 in chapter 4.5.3. FIG. 2 shows an example of the frame structure and how pilots are located in DVB-T in accordance with a further embodiment of the invention. Reference information, taken from the reference sequence, is transmitted in scatter pilot cells in every symbol. Scattered pilot cells are always transmitted at the "boosted" power level. The pilot insertion pattern is shown in FIG. 2. In FIG. 2 black dots represent boosted pilot and circles without black interior represent data information. Advantageously, the boosted pilots can be applied as the prior reference information in determining an estimate for the data values corrupted by the impulse interference.

Figure 3:
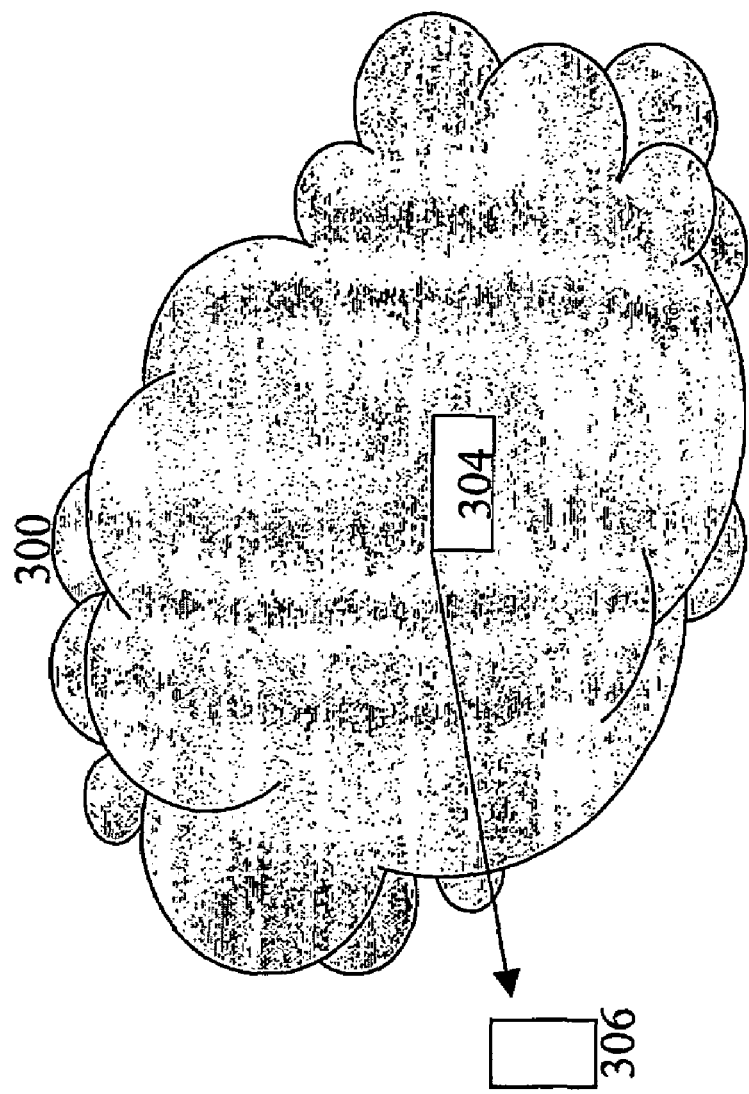
FIG. 3 shows a general architecture of the system where principles of the invention can be applied.

FIG. 3 has been described in the foregoing. In the following, corresponding reference signs have been applied to corresponding parts. Some embodiments of the invention apply the system of FIG. 3. A receiver 306 operates preferably under the coverage of a digital broadcast network (DBN) 300. The receiver 306 is capable of receiving IP based services that the DBN 300 is providing. The transmission of the DBN 300 comprises Transport Stream (TS). The DBN 300 comprises means for modifying the transport stream that it is transmitting. The DBN 300 provides means for generating and transmitting the signal having the prior reference information and data information as described in the example of FIG. 2. The boosted pilot values are included in the TS. Moreover, guard band values can be applied from the received TS. The receiver 306 receives the TS transmitted by the DBN 300. The receiver 306 can of course identify data and the prior reference information. The receiver 306 detects also the impulse interference. Therefore, the receiver 306 can create an estimate for data values representing original signal using both the received signal and the prior reference information. Advantageously, a user of the receiver 306 does need to give beforehand modifications to such activities, and the receiver 306 can perform the correction continuously while receiving the service. Advantageously, the receiver 306 does not require any interaction for correcting the data values representing the original signal. Therefore, the embodied invention is cost efficient.

Still referring to FIG. 3, the digital broadcast network (DBN) 300 transfers the data to the user over a data link. Examples of the DBN 300 are a Digital Video Broadcasting (DVB) or alternatively ISDB-T network configured to transfer data information. Advantageously, a terrestrial digital video broadcast (DVB-T) network is applied in the invention. The DBN 300 comprises an ability to transfer data over the data link. Before the transmission, the data is processed in the DBN 300. As is well known in the art, IP encapsulators 304 perform a multi-protocol encapsulation (MPE) and places the IP data into Moving Picture Experts Group-Transport Stream (MPEG-TS) based data containers. The encapsulators 304 perform the generation of the tables, the linking of the tables and the modification of the tables. Alternatively, a multiplexer of the DBN 300 can perform this. According to some embodiments, the operation of the IP encapsulators 304 may involve placing the received data into UDP packets, which are encapsulated within IP packets, which are in turn encapsulated into DVB packets. Details of this multi-protocol encapsulation technique may be found, for example, in standard document EN 301 192, incorporated herein as a reference. At the application layer, usable protocols include UHTTP (unidirectional HTTP), RTSP (Real-Time Streaming Protocol), RTP (Realtime Transport Protocol), SAD/SDP (Service Announcement Protocol/Service Description Protocol) and FTP.

In certain further embodiments, IP encapsulation may make use of IPSEC (Internet Protocol Security) to ensure that content will only be usable by receivers with the appropriate credentials. During the encapsulation process, a unique identifier may be added to at least one of the headers. For example, when UHTTP is used, the unique identifier may be encoded in the UHTTP header under the UUID field. Therefore in certain embodiments, to cater for the delivery of data to a particular terminal or group of terminals, the containers may also hold address information which can be identified and read by a conditional access component in the receiver 306 to determine whether the data is intended for that terminal. Alternatively, to cater for the delivery of data to a plurality of terminals multicast can be applied, and advantageously single sender can reach multiple receivers. A Virtual Private Network (VPN) can also be formed in the system of the DBN 300, and the receiver 306. A certain bandwidth of the DBN 300 broadcasting is allocated to a point-to-point or point-to-multipoint communication from the DBN 300 to the receiver 306. The DBN 300 may also have various transmission channels for other streams running. The receiver 306 performs a multi-protocol decapsulation to form the IP data packets.

The DVB packets so produced are transmitted over the DVB data link as is known in the art. The receiver 306 receives digitally broadcast data. The receiver 306 receives the prior reference information and can correct data values of the signal infected by the impulse interference. Therefore, the receiver 306 can substantially receive the data service, and the user can consume the provided service using the receiver 306. When a transmission rate is specified by the caster, that rate is adhered to.

Figure 4:
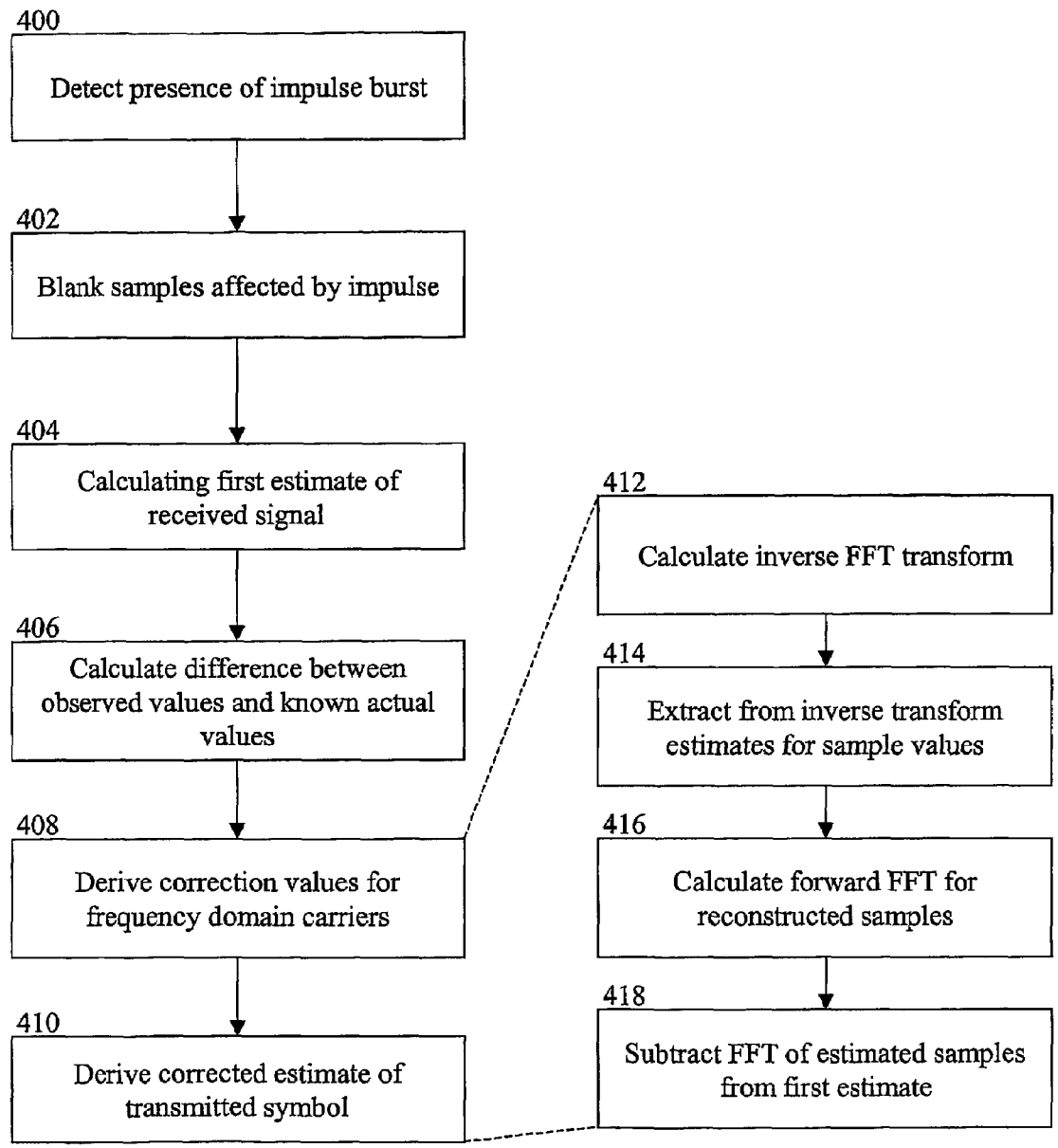
FIG. 4 depicts in a form of a flowchart a method for receiving a multi-carrier signal, where impulse interference is reduced in data reception in accordance with an embodiment of the invention.

FIG. 4 has been described in the foregoing. In the following, corresponding reference signs have been applied to corresponding parts. An example of FIG. 4 reduces and tolerates impulsive burst noise in pilot based OFDM systems, especially using DVB-T standards. A received signal is analog to digital (A/D) converted and samples of the received signal is processed. There could be IQ-split in any convenient phase either before A/D or after. The example of FIG. 4 assumes complex signal notation everywhere and is general in that sense.

In step 400, there is detected the presence of the impulse noise. This may comprise a detection of a level or a power of the impulse. The burst noise detection can be based on the sliding window calculation method, where the power of a number of samples is calculated. The number should be relatively small, maybe between 5 and 15 (8 samples is roughly 1 μs in DVB-T). If difference to a reference value is greater than a threshold, a presence of the impulse noise is decided. Other methods can be used as well. In step 402 the samples affected by the impulse is blanked. Preferably, the length of this blanking interval should be equal to the impulse burst length provided that maximum length for restoration is not exceeded. One could also use a selection of predetermined blanking lengths, in further embodiments only one length. Generally, there may be several disjoint blanking intervals within one symbol period. The banking interval can be in the range of 1 to 100 samples (or 1 to 500), and in the 8 k system can be even up to 1000 samples. In step 404 there is calculated a first estimate of the received signal. A Fast Fourier Transformation (FFT) is calculated with the blanking(s) and the result of the calculation is saved. At this phase the first estimate of the transmitted signal is obtained. Due to blanking, some distortion will be present. The values of the pilot carriers are not those which were transmitted but distorted. However, the correct pilot values are known provided that any previous symbol was correctly received (in the channel estimation sense), and that the channel has not changed too much from symbol to symbol so that a first estimate of the channel state can be fairly reliably made based on the history. This is very valid assumption for fixed and portable reception and can be valid also for mobile scenarios. Also, the guard band (in the frequency domain) will have nonzero (in addition to noise) sample values. Without blanking and noise these would be zero. In step 406 a difference between the observed and the known actual values are calculated. The known actual values comprise prior reference information such as the pilots or guard bands values. For pilots these known values are transmitted pilot values multiplied with the channel estimate on pilot frequencies. For the guard band these reference values are zero.

Some further embodiments of steps 408 and 410 are depicted in steps 412, 414, 416 and 418.

Still referring to FIG. 4, correction values for the frequency domain carries are derived in step 408. Correction values for the frequency domain carriers are derived taking the FFT of restored time domain samples. In step 410 corrected estimate of received/transmitted symbol is derived. The corrected estimate of the received symbol is derived by summing the correction values of step 408 to the first estimate of carriers derived in step 404.

Still referring to FIG. 4, inverse FFT transform (IFFT) is calculated in step 412. The inverse FFT transform (IFFT) is calculated from the difference values determined previously in step 406. Preferred embodiments use regularly uniformly taken carrier samples including pilots and possibly some guard band carriers. For DVB-T it is preferred to take every 3rd carrier (two zero samples between pilot values). Estimates for sample values are extracted from the inverse transform in step 414. From the inverse transform (step 412) there are extracted the estimates for the sample values which were blanked in the step 402. Preferably, the number of blanked symbols should not exceed (at least much) the number of pilots within the useful signal band. The appliance of the guard interval information does not substantially change the situation. Forward FFT is calculated for reconstructed samples in step 416. The forward FFT (using the original detection full FFT) is calculated for the reconstructed samples substantially within the blanking interval. Step 412 will give result which shall have nonzero sample values outside the blanking interval. At this phase taking the FFT substantially within the blanking interval will give an estimate how these samples affect on all carrier frequencies. The result is a good estimate. FFT of estimated samples is subtracted from first estimate in step 418. The corrected estimate of the received/transmitted symbol is now calculated by subtracting the (possibly properly scaled) FFT of the estimated samples from the estimates generated in step 402. The corrected carrier values will be forwarded as usual. Therefore, the data service can be substantially received tolerating the interferences.

The method of FIG. 4 is not theoretically exact but result in a very good approximation, especially, for the case where minimum mean square estimate for the blanked samples is searched under the condition that the error in the known values (pilots mainly) is minimized. Alternatively, taking a second round of iteration using the same principle (as in the method of FIG. 4) may improve the interference tolerance but this is not a mandatory embodiment.

Figure 5:
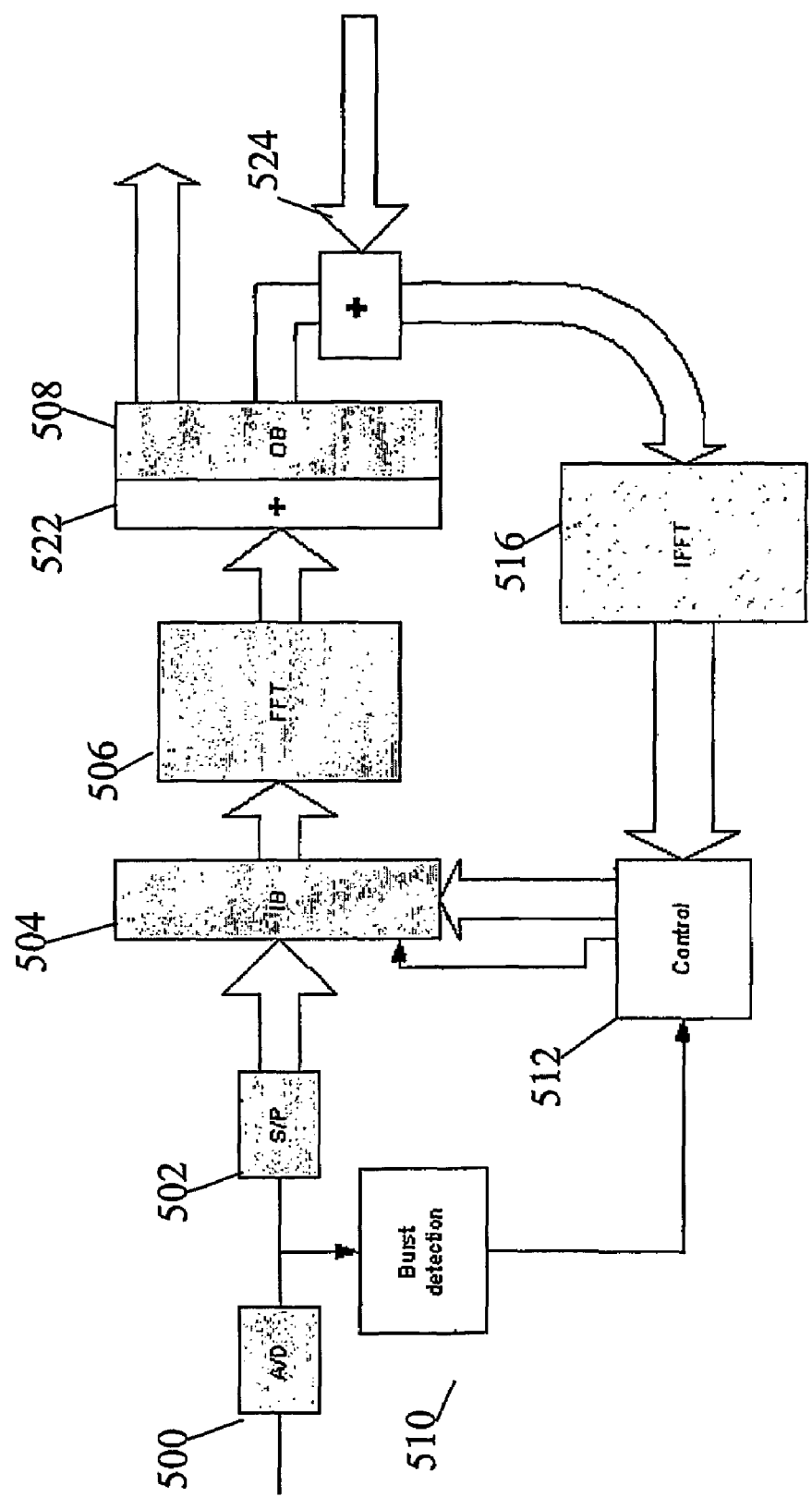
FIG. 5 depicts a functional block diagram for receiving a multi-carrier signal, where impulse interference is reduced in data reception in accordance with an embodiment of the invention.

FIG. 5 has been described in the foregoing. In the following, corresponding reference signs have been applied to corresponding parts. An example of FIG. 5 depicts a functional block diagram of a receiver. An A/D converter 500 receives the signal and performs the conversion. The IQ split may be either before or after the converter 500. A burst detection circuit 510 detects the impulse interference burst(s). A serial-to-parallel converter 502 performs demultiplexing of the received data signal. The blanking, for example of step 402, can take place before serial-to-parallel conversion but is preferably performed in an input buffer (IB) 504. A control device 512 controls the IB 504, which control device 512 keeps record on the corrupted sample indexes. Using the index information in control device 512 and by filling the corresponding memory slots in the IB 504 the estimates for the sample values, which were blanked in the step 402 of FIG. 4, are extracted from the inverse transform (step 412). A FFT circuit 506 performs the FFT transformation. The same FFT circuit 506 can be used in steps 402 and 416 of the FIG. 4. So this processing can be done with fairly low cost and low complexity. Also the FFT is calculated for the blanking interval (other inputs are zero, i.e. the other memory slots should be set zero in the IB 504) so this should take much less energy than the full FFT in a normal detection. Actually, the sum of energies in steps 402 and 416 should be only slightly over the energy requirement in the normal detection without blanking. A subtraction circuit 522 performs the subtraction of step 418 of FIG. 4. In an output buffer (OB) 508 the result of the calculation of the FFT with the blanking(s) is saved. The calculated estimates are retrieved from the OB 508 when the corrected estimate of the transmitted symbol is calculated by subtracting the (properly scaled) FFT of the estimated samples from the estimates (in step 418). A summating circuit 524 performs the calculation of the difference between the observed value and the known actual value of step 406. A IFFT circuit 516 perform the inverse FFT of step 412.

Some embodying implementations of FIG. 5 may seem to raise some costs and decrease the cost efficient of the invention because of seeming complexity (in addition to relatively simple control and summing etc.) These can be the inverse FFT circuit 516. However, this is relatively minor factor because the effective size is determined by the number of used pilots (and possible guard interval values). As the number of pilots in one symbol is about N/12 (for DVB-T) where N is the number of carriers in the OFDM symbol, the actual effective size for this inverse FFT could be only about 8.5% of the main FFT. It seems that this complexity might well be justified to get the significant performance improvement.

Actually in some actual chip implementations there is already available an inverse FFT of adequate size for other reasons and, hence, the backward FFT needed by the embodiment of FIG. 5 is already existing and could be "borrowed" for this purpose in those cases where OFDM symbol is corrupted by the impulsive burst noise.

Some embodiments of the FIG. 5 blocks can be substantially divided into four parts: detection of burst (position and preferably also length), blanking and FFT of blanked samples, estimation of blanked symbols and correction of the first estimate of the received symbol.

Some embodiments of the invention apply detection of burst. Examples of FIGS. 4 and 5 apply the detection of burst. For burst detection there are several possibilities (some known earlier from literature). Preferred method is using the sliding window approach where the instantaneous received power is monitored and compared to some reference value. This reference could, for example, be the mean power of the previous symbol (the signal level remains substantially at the same level that the measurement could be reasonably reliable—at least for fixed or portable reception). The reference could also be some earlier, delayed value of the sliding window power calculation. Other possible means for burst detection are monitoring the exceeding of some threshold level in amplitude. Also while applying this method the window approach can be useful. The decision criterion can be having a certain number of level crossings during the window, and all the samples belonging to window can be marked "under burst". Still another approach can be monitoring amplitude variations. One could calculate the difference of two successive samples, take the absolute value and compare to a threshold. Again, the window approach is also in this method useful, and one can decide the presence of the burst if number of variations exceeding the threshold value exceeds some limit number. There are also other possible approaches, for example, combinations of the above ones.

Some embodiments of the invention apply blanking. Examples of FIGS. 4 and 5 apply the blanking. For blanking appliance there are also several possibilities. One easy to implement is using only the burst position information and constant blanking duration. A slightly more complicated is to use a couple of different lengths of blanking interval. The selection can be based on general channel conditions or using results of burst detection. A more sophisticated and efficient way of handling blanking is based using both position and duration information. Those samples, which belong to the window fulfilling the burst criterion, would be blanked. This can lead to several disjoint blanking intervals of varying length within one symbol. An embodied invention can handle these very effectively provided that total number of blanked samples does not significantly exceed the correction capability. The receiver could limit the number of blanked symbols to a value which is of the order of correction capability. The preferred appliance is to blank all the samples where significant impulse burst power is detected even if the correction capability is exceeded. This method can do under such a severe situation. A still more sophisticated and elaborated version of the above scheme is search the samples where the burst power is the highest and blank those samples up to about the correction limit. The other corrupted samples, should there such exist, would be left intact. Preferably, too much complexity is avoided, as the performance difference between simple and complicated way is not substantial.

Some embodiments of the invention apply estimation of blanked symbols. Examples of FIGS. 4 and 5 apply the estimation of blanked symbols. For estimation of blanked samples there are several possible approaches also. General approach uses all the prior known information, for example, both the pilot values and the guard band values. Then the inverse FFT should be of full size (for example, for 8 k system it should be 8 k) but the unknown carrier values should be zero in taking the IFFT. This can mean some saving in complexity and power consumption as compared to the conventional detection FFT. Furthermore, especially for this approach, one can use the already existing full FFT because IFFT and FFT are simply related (time inversion or conjugations and multiplicative factor N). Another approach is to use dedicated FFT for calculating the inverse transform of pilots (and possibly guard interval values). Here one would like to use regularly spaced samples of decoded carriers. The interval is pilot spacing p, so that every $p^{th}$, where p is 12 for DVB-T, carrier value is taken to the IFFT. However, for DVB-T numbers the total number of FFT points (8 k or 2 k) is not divisible with 12. Instead, one could pick every 3rd carrier sample which would lead to IFFT sizes of approximately 4 k and 1 k. The sample values, which will not fall on pilot frequencies, can be set to zero. Of course, one could use the 4 k IFFT also for 2 k signals by just filling the about 3.3 k unused sample values with zeroes. The use of dedicated (or borrowed) small size (for DVB-T 2 k) IFFT may be justified because the delay caused by this would be smaller than calculating the full-size FFT. The approach above using regularly sampled carrier values could also use the already existing FFT circuit. The result of the first calculation (the first estimate of the received signal) should be saved in the buffer memory so that the result of the sample estimates can be read after using the FFT for calculating IFFT and used for further processing. Actually, in some architecture this might be desirable because normally the forward FFT has nothing to do while waiting for the inverse FFT results. There is one variation of the reuse of forward FFT in a particular way. In the further embodiment where only one continuous blanking interval is allowed and its length is limited to be less than the number of carriers in the guard band. Then one can rotate the input signal after blanking in the input buffer 504 (the embodiment of FIG. 5) to the position where blanked samples are in the positions corresponding to the empty carriers. Then the receiver calculates the first FFT and stores the values to the output buffer 508 (embodied FIG. 5). The pilot values are read, differences calculated and transferred to the now empty input buffer 504. The IFFT is calculated and only the results in the locations corresponding originally the guard band are read. The earlier calculated values in the other part of the output buffer 508 are kept intact. The sample estimates from the guard band locations are transferred to the input buffer 504 to the location where the blanked samples were. Now taking the FFT of these samples one gets correction values to be subtracted from the values waiting in the output buffer 508. A phase correction may then have to be applied to all the corrected carriers to eliminate the effect of rotation in the input buffer 504. This principle can be applied in various other embodiments. Some cases where there are several blanking intervals, which are not close to each other, may decrease the efficiency.

Some embodiments of the invention apply correction of the first estimate of the received symbol. Examples of FIGS. 4 and 5 apply the correction of the first estimate of the received symbol. For correction of the first estimate there are also several approaches. The ones using less energy are based on calculating FFT only for the recovered samples and subtracting (or summing, depending on the definitions) the results from the first estimates of carrier values. Another approach is to calculate the recovered sample values, replace the empty slot of blanked samples in the input buffer 504 with these and calculate the full forward FFT anew with the full input signal thus recovered. The result will be the desired corrected signal without any further processing. This approach at least reduces or uses the least circuit but uses a bit more power than the partial calculations.

Preferred embodiments of the invention are implemented on chip at the receiver device. For example, the invention is included in DVB-T chip at the receiver device. Alternatively, the invention is applicable at an inter-mediator intermediating data traffic in broadcast system, for example, a gateway bridging communication between at least two different network interfaces. Some embodiments of the invention supports portable reception in IP datacast receivers, and can, possibly, work under severe condition. Thus, the performance of the embodiments boosts benefits of the invention such as economy. For example, DVB-T offers an effective and cheap way to distribute data, and the embodiments promote the reception even under severe or noisy conditions.

Figure 6:
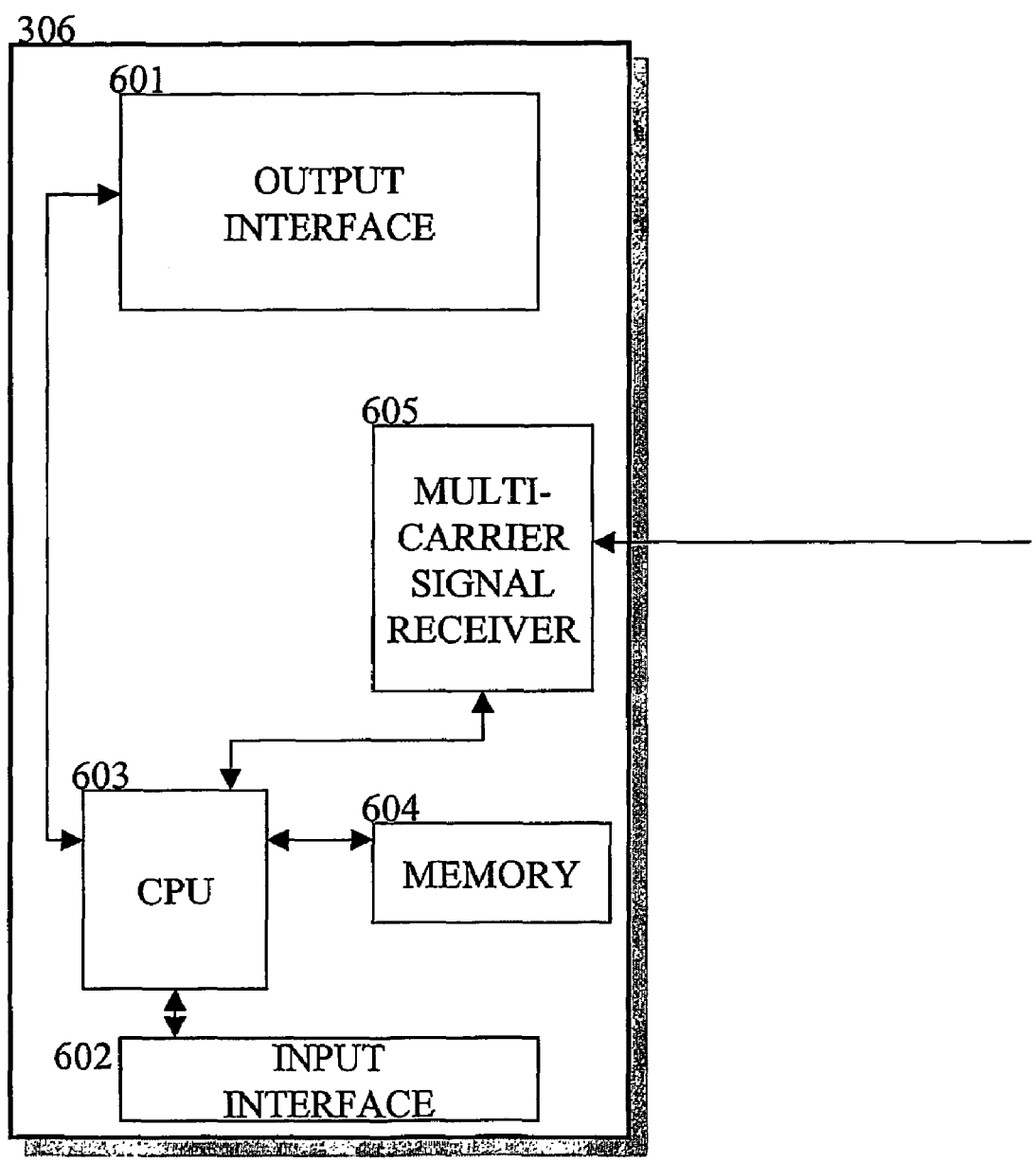
FIG. 6 depicts a receiver for receiving a multi-carrier signal, where impulse interference is reduced in data reception in accordance with an embodiment of the invention.

FIG. 6 has been described in the foregoing. In the following, corresponding reference signs have been applied to corresponding parts. An example of FIG. 6 depicts a functional block diagram of a receiver. The receiver 306 of FIG. 6 may be used in any/all of the example(s) of FIGS. 3 and 4. The receiver 306 comprises a processing unit CPU 603, a multi-carrier signal receiver part 605 and a user interface UI (601, 602). The multi-carrier signal receiver part 605 and the user interface UI (601, 602) are coupled with the processing unit CPU 603. The user interface UI (601, 602) comprises a display and a keyboard to enable a user to use the receiver 306. In addition, the user interface UI (601, 602) comprises a microphone and a speaker for receiving and producing audio signals. The user interface UI (601, 602) may also comprise voice recognition (not shown). The processing unit CPU 603 comprises a microprocessor (not shown), memory 604 and possibly software SW (not shown). The software SW can be stored in the memory 604. The microprocessor controls, on the basis of the software SW, the operation of the receiver 306, such as the receiving of the data stream, the tolerance of the impulse burst noise in the data reception, displaying output in the user interface UI and the reading of inputs received from the user interface UI. The operations are described in the example of FIG. 4. For example, the hardware (not shown) comprises means for detecting the signal, means for demodulation, means for detecting the impulse, means for blanking those samples of the symbol where significant amount of impulse noise is present, and means for calculating estimates, and means for performing the corrections of the corrupted data.

Still referring to FIG. 6, alternatively, middleware or software implementation can be applied (not shown). The receiver 306 can be a hand-held device which the user can comfortably carry. Advantageously, the receiver 306 can be a cellular mobile phone which comprises the multi-carrier signal receiver part 605 for receiving the broadcast transmission stream. Therefore, the receiver 306 may possibly interact with the service providers.

Figure 7:
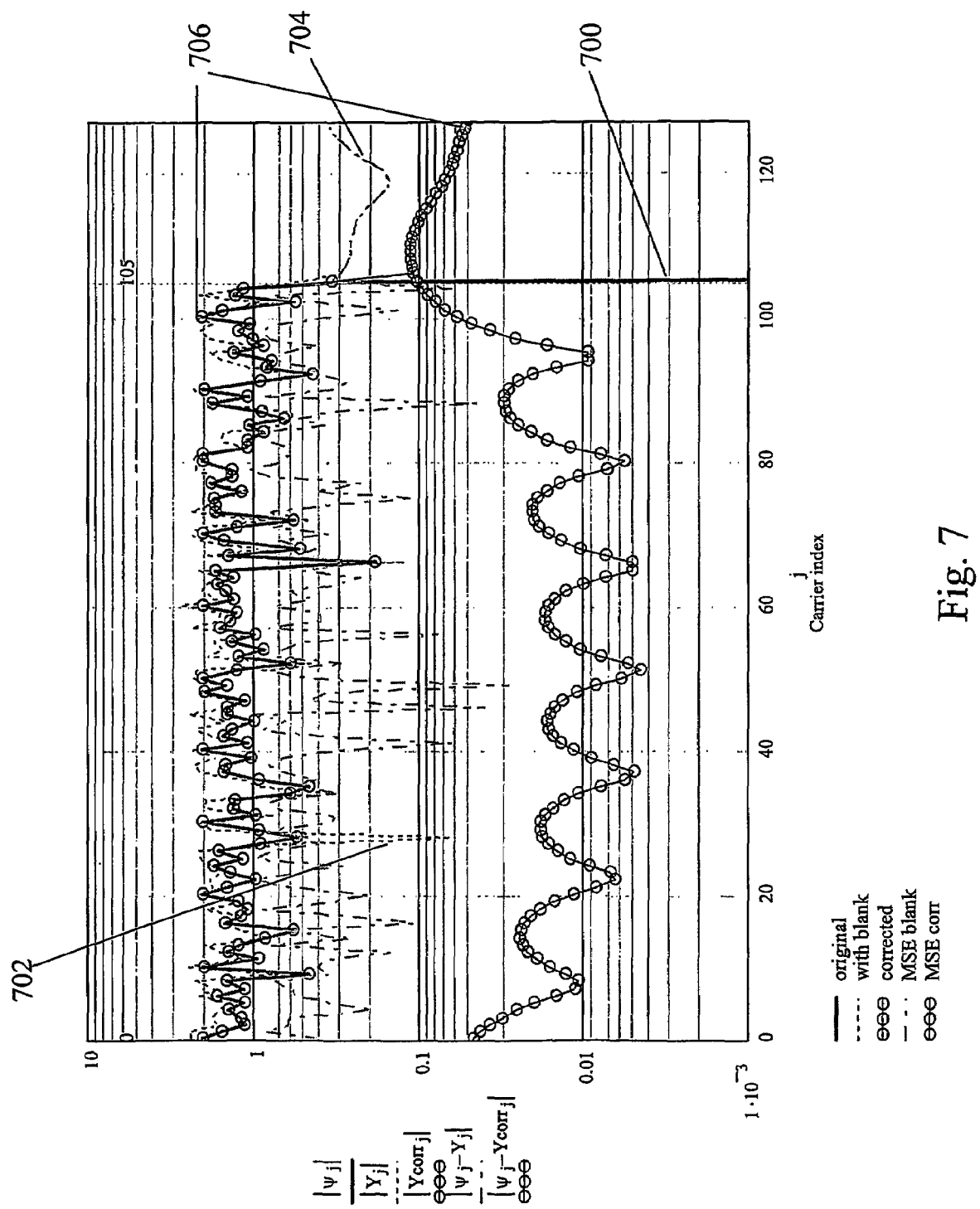
FIG. 7 shows an example of a result for a simplified OFDM signal with 128 carriers, where an impulse interference reduction is demonstrated in accordance with a further embodiment of the invention.

FIG. 7 shows an example of a result for a simplified OFDM signal with 128 carriers, where an impulse interference reduction is demonstrated in accordance with a further embodiment of the invention. Thus, the potential of the embodied invention is demonstrated by the example with 128 OFDM signal having pilots at intervals 10 and active carriers from 0 to 105. The test signal has been generated using carriers with random phase and amplitude. The amplitude of the "data carriers" has been limited so that the pilot power is 16/9 times the maximum power of data carriers. The generated signal samples are blanked in the time domain (9 samples with indexes from 10 to 18). A curve 700 represents the original signal without the blanking. A dotted curve 702 represents received spectrum with the blanking (with power corrected to the nominal level). The corresponding absolute value of error is represented in a dash-dot curve 704. The corrected results according to the invention are given with curves with circles (706). The blanked signal has been corrected to the nominal level using the pilot powers. In addition, the same figure depicts also the decoded signal according to the invention. It can be noted that at least the carrier amplitudes match much better with the embodied invention. A more descriptive way of comparing the results is to look at the error signal amplitudes (for example, the absolute value of the difference of the received carrier complex value and original value) on each carrier. The two lowest curves (704, 706) in FIG. 5 give these. One may conclude that there is at least about 10 fold difference in error amplitudes or 20 dB in error power. Actually the calculated power difference for this example taken over the whole symbol can be 26.5 dB.

Figure 8:
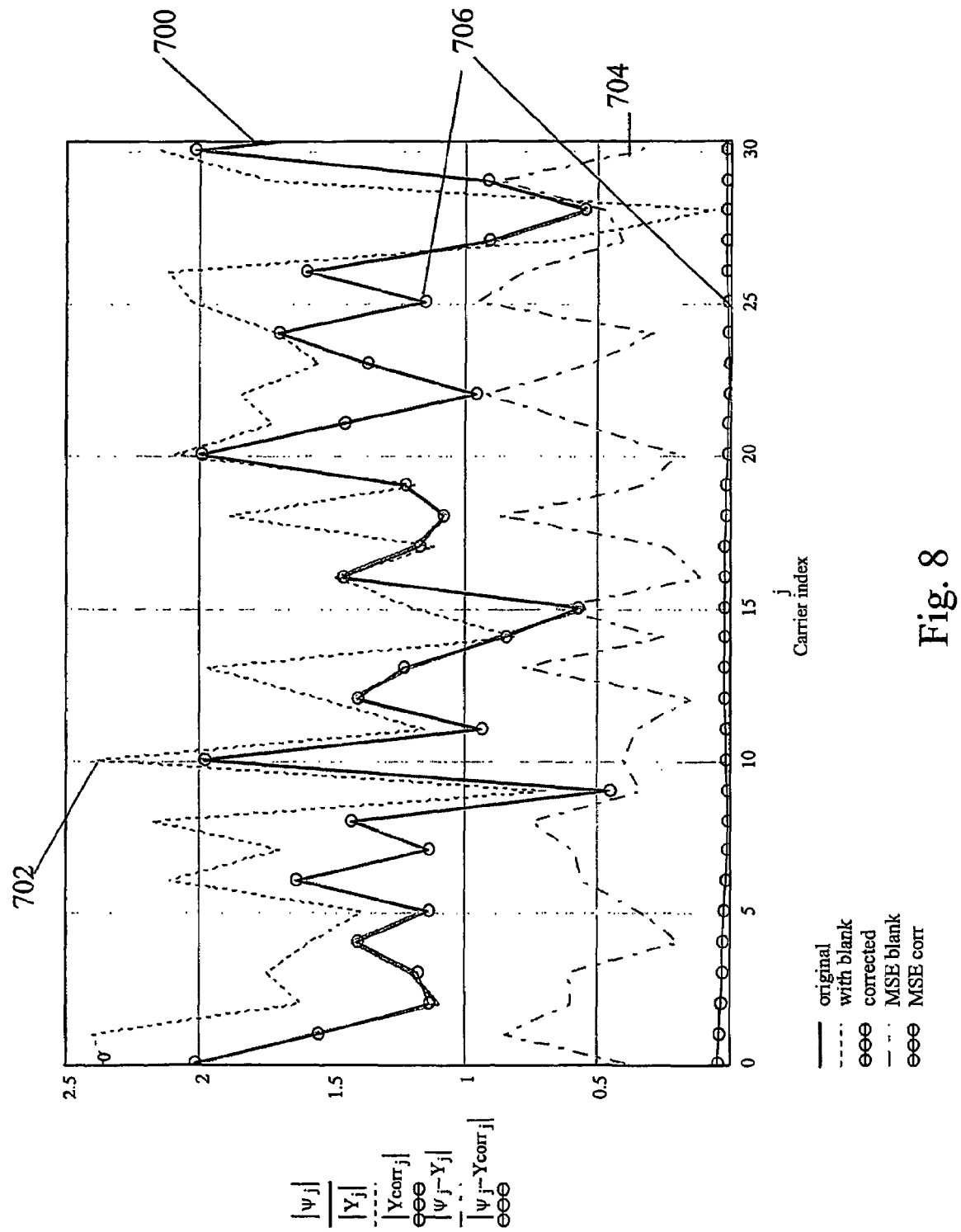
FIG. 8 shows a detail of FIG. 7 expanded and in absolute scale.

FIG. 8 shows a detail of FIG. 7 expanded and in absolute scale. FIG. 8 gives a detailed view of the signals (700-706) for the carriers from 0 to 30.

Preferably, the combined length of the impulse burst is less or about the same order as the number of pilot carriers in the OFDM signal. For example, burst lengths is of the order of 100 μs for 8 k systems and about 25 μs for 2 k systems.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method comprising:
   detecting a presence of impulse interference within a multi-carrier signal, and
   replacing digital values substantially affected by the impulse interference with estimated digital values, which are obtained by determining an estimate in a frequency domain based on modified digital values substantially affected by the impulse interference and prior known information, the estimated digital values representing a desired signal, wherein the modified digital values are based on blanking digital values substantially affected by the impulse interference to obtain a signal with blanking, and wherein the replacing further comprises:
   calculating a pre-estimate of the signal with the blanking in the frequency domain,
   calculating a difference between the pre-estimate and the prior known information,
   calculating said estimate of the blanked signal using the difference in the frequency domain,
   deriving correction values, and deriving the estimated digital values representing the desired signal.

2. A method according to claim 1, wherein the calculating the estimate, deriving correction values and deriving the estimated digital values comprise:
calculating a frequency domain to time domain transform of the difference to obtain transformed difference,
extracting digital values coincident with the blanking from the transformed difference to obtain an extraction,
calculating a time domain to frequency domain transform for blanking interval of the extraction, and
subtracting the time domain to frequency domain transformed extraction from the pre-estimate to obtain the estimated digital values representing the desired signal.

3. A method according to claim 2, wherein the frequency domain to time domain transform is of full size and any unknown carrier value is indicated by zero.

4. A method according to claim 2, wherein the frequency domain to time domain transform comprises a dedicated transform.

5. A method according to claim 2, wherein the frequency domain to time domain transform comprises an inverse Fast Fourier Transform.

6. A method according to claim 2, wherein the time domain to frequency domain transform comprises a Fast Fourier Transform.

7. A method according to claim 2, wherein the detecting is based on a sliding window calculation.

8. A method according to claim 1, wherein the detecting is based on a sliding window calculation.

9. A method according to claim 1, wherein the detecting is based on monitoring an exceeding of a threshold in amplitude of the signal.

10. A method according to claim 1, wherein the detecting is based on monitoring amplitude variations.

11. A method according to claim 1, wherein the blanking comprises blanking a predetermined amount of digital values substantially coincident with the impulse interference.

12. A method according to claim 11, wherein the predetermined amount comprises a blanking interval of samples in the range of 1 to 500 samples.

13. A method according to claim 1, wherein the blanking comprises blanking digital values wherein significant amount of the impulse interference is detected.

14. A method according to claim 1, wherein the blanking comprises blanking digital values which coincident with the impulse interference.

15. A method according to claim 1, wherein the blanking comprises searching an amplitude peak indicative of the impulse interference and blanking digital values down to about a correction limit.

16. A method according to claim 1, wherein the blanking comprises blanking digital values directly affected by the impulse interference and digital values neighboring the impulse interference.

17. A method according to claim 1, further comprising storing the preestimate in a buffer.

18. A method according to claim 1, wherein the prior known information comprises at least one of pilot carrier values and guard band values.

19. A method according to claim 18, wherein the pilot carrier values comprise transmitted pilot values multiplied with a channel estimate on pilot frequencies.

20. A method according to claim 18, wherein the guard band values comprise references indicating zero.

21. A method according to claim 1, wherein the multi-carrier signal comprises an orthogonal frequency division multiplexing signal.

22. A method according to claim 21, wherein the orthogonal frequency division multiplexing signal is operable in at least one of a digital video broadcasting system, a terrestrial digital video broadcasting system and a terrestrial integrated services digital broadcasting system.

23. A method according to claim 1, wherein the prior known information comprises either (1) pilot values or (2) pilot values and guard band values.

24. A method according to claim 23, further comprising detecting an amount of interference based on the prior known information.

25. A method according to claim 1, further comprising calculating correction values based on the estimate in the frequency domain.

26. A method according to claim 1, wherein the estimate in the frequency domain estimates variation within the signal due to impulse interference.

27. An apparatus comprising:
a detection module configured to detect a presence of impulse interference within a multi-carrier signal, and
a replacing module configured to replace digital values substantially affected by the impulse interference with estimated digital values, which are obtained by an estimate module configured to determine an estimate in a frequency domain based on modified digital values substantially affected by the impulse interference and prior known information, the estimated digital values representing a desired signal, wherein the modified digital values are based on blanking digital values substantially affected by the impulse interference to obtain a signal with blanking, and wherein the replacing module is further configured to perform the following:
calculating a pre-estimate of the signal with the blanking in the frequency domain,
calculating a difference between the pre-estimate and the prior known information,
calculating said estimate of the blanked signal using the difference in the frequency domain,
deriving correction values, and
deriving the estimated digital values representing the desired signal.

28. An apparatus according to claim 27, wherein the broadcast multi-carrier signal comprises an orthogonal frequency division multiplexing signal.

29. An apparatus according to claim 28, wherein the orthogonal frequency division multiplexing signal is operable in at least one of a digital video broadcasting system, a terrestrial digital video broadcasting system and a terrestrial integrated services digital broadcasting system.

30. An apparatus according to claim 27, further comprising means for interaction with a service provider providing the multi-carrier signal.

31. An apparatus according to claim 30, wherein the means for interaction comprises a cellular mobile module operable under coverage of a cellular mobile network.

32. An apparatus according to claim 27, wherein the replacing module and the estimate module comprises circuit arrangement performing a time domain to frequency domain transform.

33. An apparatus according to claim 32, wherein the replacing module and the estimate module further comprises a module configured to perform an inverse time domain to frequency domain transform.

34. An apparatus according to claim 27, further comprising a broadcast multicarrier signal receiving module.

35. An apparatus according to claim 27, further comprising a user terminal configured to obtain at least one service which is received within the signal.

36. A system comprising:
means for detecting a presence of impulse interference within a multi-carrier signal, and
means for replacing digital values substantially affected by the impulse interference with estimated digital values, which are obtained by determining an estimate in a frequency domain based on modified digital values substantially affected by the impulse interference and prior known information, the estimated digital values representing a desired signal, wherein the modified digital values are based on blanking digital values substantially affected by the impulse interference to obtain a signal with blanking, and wherein the means for replacing is further configured to perform the following:
calculating a pre-estimate of the signal with the blanking in the frequency domain,
calculating a difference between the pre-estimate and the prior known information,
calculating said estimate of the blanked signal using the difference in the frequency domain,
deriving correction values, and
deriving the estimated digital values representing the desired signal.

37. A system according to claim 36, wherein the system comprises at least one of a digital video broadcasting system, a terrestrial digital video broadcasting system and a terrestrial integrated services digital broadcasting system.

38. One or more computer-readable media storing computer-executable instructions configured to cause a computing device to perform a method comprising:
detecting a presence of impulse interference within a multi-carrier signal, and
replacing digital values substantially affected by the impulse interference with estimated digital values, which are obtained by determining an estimate in a frequency domain based on modified digital values substantially affected by the impulse interference and prior known information, the estimated digital values representing a desired signal, wherein the modified digital values are based on blanking digital values substantially affected by the impulse interference to obtain a signal with blanking, and wherein the replacing further comprises:
calculating a pre-estimate of the signal with the blanking in the frequency domain,
calculating a difference between the pre-estimate and the prior known information,
calculating said estimate of the blanked signal using the difference in the frequency domain,
deriving correction values, and
deriving the estimated digital values representing the desired signal.

39. A method comprising:
recognizing a presence of impulse burst,
blanking samples which are affected by the impulse burst,
calculating a time domain to frequency domain transform of a multi-carrier signal with the blanked samples to obtain a first estimate,
calculating a difference between values of the first estimate and prior know information values,
calculating a frequency domain to time domain transform of the difference,
extracting from the frequency domain to time domain transformed difference the first estimate for the blanked samples to obtain a second estimate,
calculating the time domain to frequency domain transform of the second estimate for a period of the blanked samples to obtain a third estimate,
summing the third estimate with the first estimate to obtain a representation of a desired signal.

40. An apparatus comprising:
means for detecting a presence of impulse interference within a multi-carrier signal, and
means for replacing digital values substantially affected by the impulse interference with estimated digital values, which are obtained by determining an estimate in a frequency domain based on modified digital values substantially affected by the impulse interference and prior known information, the estimated digital values representing a desired signal, wherein the modified digital values are based on blanking digital values substantially affected by the impulse interference to obtain a signal with blanking, and wherein the means for replacing is further configured to perform the following:
calculating a pre-estimate of the signal with the blanking in the frequency domain,
calculating a difference between the pre-estimate and the prior known information,
calculating said estimate of the blanked signal using the difference in the frequency domain,
deriving correction values, and
deriving the estimated digital values representing the desired signal.

* * * * *